United States Patent
Wu

(10) Patent No.: US 9,695,859 B2
(45) Date of Patent: Jul. 4, 2017

(54) FASTENING BOLT FOR USE IN CONCRETE

(71) Applicant: KING POINT ENTERPRISE CO., LTD., Kaohsiung (TW)

(72) Inventor: Cheng-Yen Wu, Kaohsiung (TW)

(73) Assignee: King Point Enterprise Co., Ltd., Kaohsiung (TW)

( * ) Notice: Subject to any disclaimer, the term of this patent is extended or adjusted under 35 U.S.C. 154(b) by 130 days.

(21) Appl. No.: 14/696,597

(22) Filed: Apr. 27, 2015

(65) Prior Publication Data

US 2016/0032956 A1 Feb. 4, 2016

(30) Foreign Application Priority Data

Jul. 31, 2014 (TW) .............................. 103213571 U

(51) Int. Cl.
*F16B 25/02* (2006.01)
*F16B 25/00* (2006.01)
*F16B 25/10* (2006.01)

(52) U.S. Cl.
CPC ...... *F16B 25/0026* (2013.01); *F16B 25/0052* (2013.01); *F16B 25/0068* (2013.01); *F16B 25/10* (2013.01); *F16B 25/0047* (2013.01)

(58) Field of Classification Search
CPC .............. F16B 25/0047; F16B 25/0052; F16B 25/0068; F16B 25/0026
USPC ................................. 411/411, 412, 414, 386
See application file for complete search history.

(56) References Cited

U.S. PATENT DOCUMENTS

| | | | | |
|---|---|---|---|---|
| 1,465,148 A | * | 8/1923 | Rosenberg .......... | F16B 25/0031 411/418 |
| 4,652,194 A | * | 3/1987 | Tajima .................... | F16B 25/00 411/386 |
| 6,086,303 A | * | 7/2000 | Fluckiger .............. | F16B 5/0275 411/399 |
| 6,152,666 A | * | 11/2000 | Walther .............. | F16B 25/0015 411/311 |
| 6,322,307 B1 | * | 11/2001 | Glover ................ | F16B 25/0068 411/412 |
| 8,348,571 B2 | * | 1/2013 | Shih .................... | F16B 25/0015 411/386 |
| 8,944,734 B2 | * | 2/2015 | Su ........................ | F16B 25/0015 411/386 |
| 2006/0285940 A1 | * | 12/2006 | Walther .............. | F16B 25/0026 411/421 |

(Continued)

*Primary Examiner* — Flemming Saether
(74) *Attorney, Agent, or Firm* — Rosenberg, Klein & Lee

(57) ABSTRACT

A fastening bolt includes a shaft defining a central axis, a head, a drilling portion, and first threads alternating with second threads. The first threads and the second threads have different outer diameters. Each first thread has a trailing surface facing the head and inclined to a line perpendicular to the central axis by a trailing angle and a leading surface facing the drilling portion and inclined to the line by a leading angle. The trailing angle is smaller than the leading angle to build an asymmetrical form. Some threads near the drilling portion form respective cutting grooves and recesses thereon. Each cutting groove is formed by walls with different lengths and opened at an angle which does not exceed 90 degrees. The bolt breaks the workpiece quickly by the cutting grooves and recesses. The asymmetrical first threads help enter the workpiece quickly and attain a firm engagement therewith.

6 Claims, 4 Drawing Sheets

(56) References Cited

U.S. PATENT DOCUMENTS

2011/0014007 A1\* 1/2011 Gaudron ................. F16B 25/00
 411/412
2011/0188966 A1\* 8/2011 Tsai ........................ F16B 35/04
 411/412
2013/0336744 A1\* 12/2013 Phua ................... F16B 25/0026
 411/387.1

\* cited by examiner

FASTENING BOLT FOR USE IN CONCRETE

BACKGROUND OF THE INVENTION

1. Field of the Invention

This invention relates to a fastener and relates particularly to a fastening bolt for use in the concrete.

2. Description of the Related Art

Referring to FIG. 1, a conventional concrete bolt 1 comprises a head 11, a shaft 12 connected to the head 11, a drilling portion 13 disposed at a distal end of the shaft 12 and a plurality of threads 14 spirally disposed on the shaft 12. A screwing operation of the concrete bolt 1 is executed by using an electric drill (not shown) to drill a pilot hole 21 in a concrete wall 2 in advance and then inserting the concrete bolt 1 into the hole 21 for engaging the concrete wall 2. This conventional structure still has problems. For example, the concrete bolt 1 usually has symmetrical threads 14. In other words, an upper flank surface and a lower flank surface of each thread 14 have the same inclined angle relative to a normal line passing an edge where the two surfaces meet, so the flank surfaces has a small gradient because of the symmetrical design. When the bolt 1 is gradually drilled into the hole 21, the flank surfaces of the threads 14 having the small gradient come into contact with the concrete wall 2 and cause some of the threads 14 close to the drilling portion 13 an over-large and incessantly-created frictional resistance. A user may impart more rotating force to overcome the resistance, but it takes time and effort to drill. Further, if more torque is exerted to force the threads 14 to enter the wall 2, the shaft 12 easily swings or enters aslant at the beginning of the drilling action. Thus, the thread structure cannot break the concrete wall 2 effectively and cannot drill vertically. These problems render wall pieces broken by the drilling action unable to travel within the hole 21 easily, so the threads 14 cannot engage the concrete wall 2 firmly after the drilling action. Thus, the fastening effect of the bolt 1 is decreased.

SUMMARY OF THE INVENTION

An object of this invention is to provide a fastening bolt for use in concrete which attains a quick drilling operation and resists the drilling resistance effectively to provide preferable mechanical properties. The fastening bolt also achieves a better fastening and positioning effect after the drilling operation.

The fastening bolt of this invention includes a shaft, a head disposed on a first end of the shaft, a drilling portion formed on a second end of the shaft opposite to the first end, a plurality of first threads spirally disposed on the shaft and a plurality of second threads spirally disposed between the first threads. An outer diameter of the second threads is smaller than that of the first threads. Each first thread has a leading surface facing the drilling portion and a trailing surface facing the head. The leading surface and the trailing surface converge on a thread ridge. Each first thread defines a line perpendicular to a central axis of the shaft, and the line passes the thread ridge. The leading surface is inclined to the line at a leading angle, and the trailing surface is inclined to the line at a trailing angle. The trailing angle is smaller than the leading angle so that each first thread can be formed into an asymmetrical design. Some of the first threads close to the drilling portion have a plurality of cutting grooves formed thereon. Each cutting groove is formed by walls with different lengths. Each cutting groove is opened at an angle which can be less than or equal to 90 degrees. The cutting grooves are preferably opened in a direction opposite to a screwing direction of the shaft. Some of the second threads close to the drilling portion also have a plurality of recesses formed thereon. The cutting grooves and recesses formed on part of the first and the second threads near the drilling portion can help break a wall of the workpiece quickly. The trailing surface and the leading surface of each first thread with different inclined angles allow the bolt to fight against the drilling resistance and enter the workpiece with no resistance, thereby attaining a rapid drilling and entering effect. The subject thread structure also prevents the shaft from drilling aslant to attain a firm engagement between the bolt and the workpiece and enhance the fastening effect.

Preferably, the trailing angle ranges from 18 degrees to 28 degrees, and the leading angle ranges from 37 degrees to 47 degrees so that each first thread can be arranged asymmetrically.

Preferably, each recess of the second thread can also be formed by support walls with different lengths and opened at an included angle which is not over 90 degrees. The recesses are opened in a direction opposite to the screwing direction.

Preferably, the shaft can be made of two materials. In a preferred embodiment, the shaft has an anti-rust section made of stainless steel and a hardened section made of carbon steel. The anti-rust section extends downwards from the head. The hardened section follows the anti-rust section and extends to the drilling portion.

The advantages of this invention are more apparent upon reading following descriptions in conjunction with accompanying drawings.

DETAILED DESCRIPTION OF THE PREFERRED EMBODIMENTS

Figure 1:
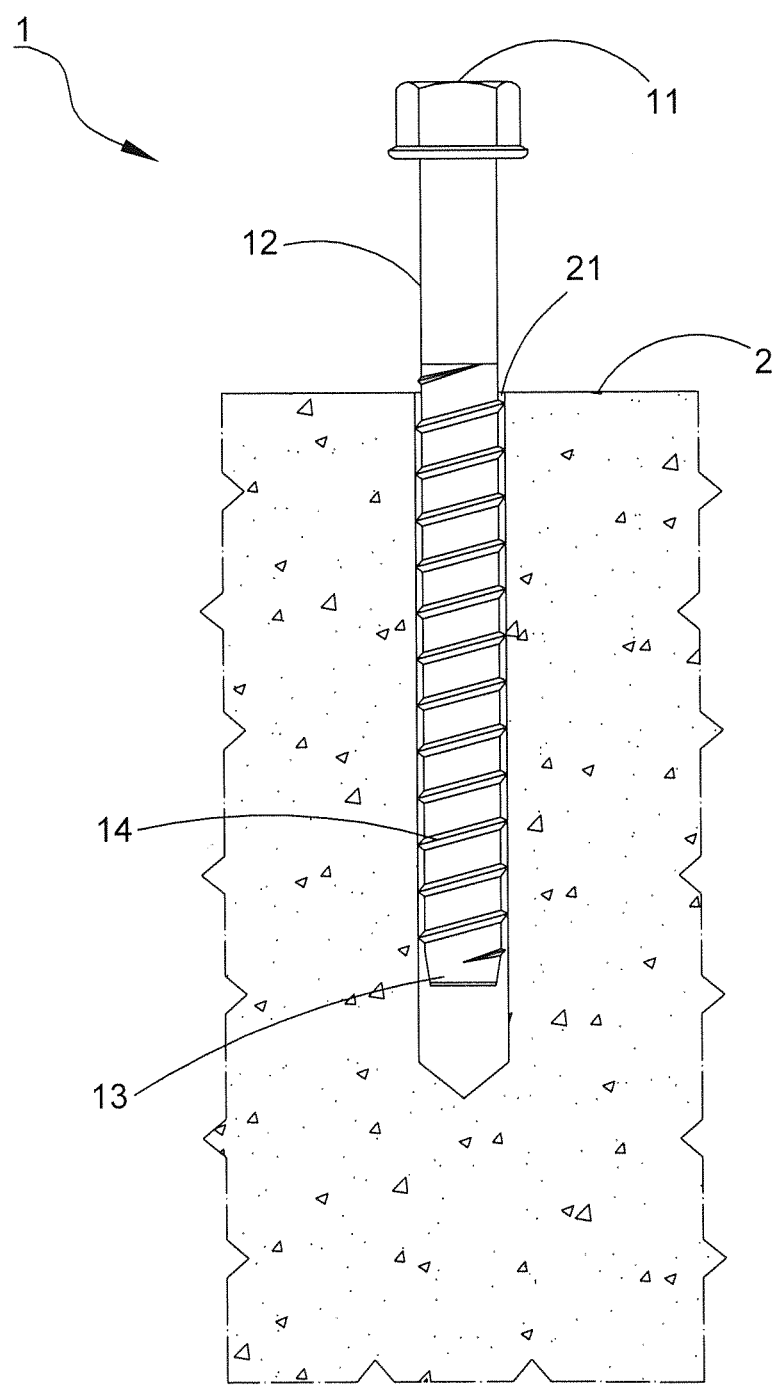
FIG. 1 is a schematic view showing a conventional concrete bolt.
Figures 2, 2A:
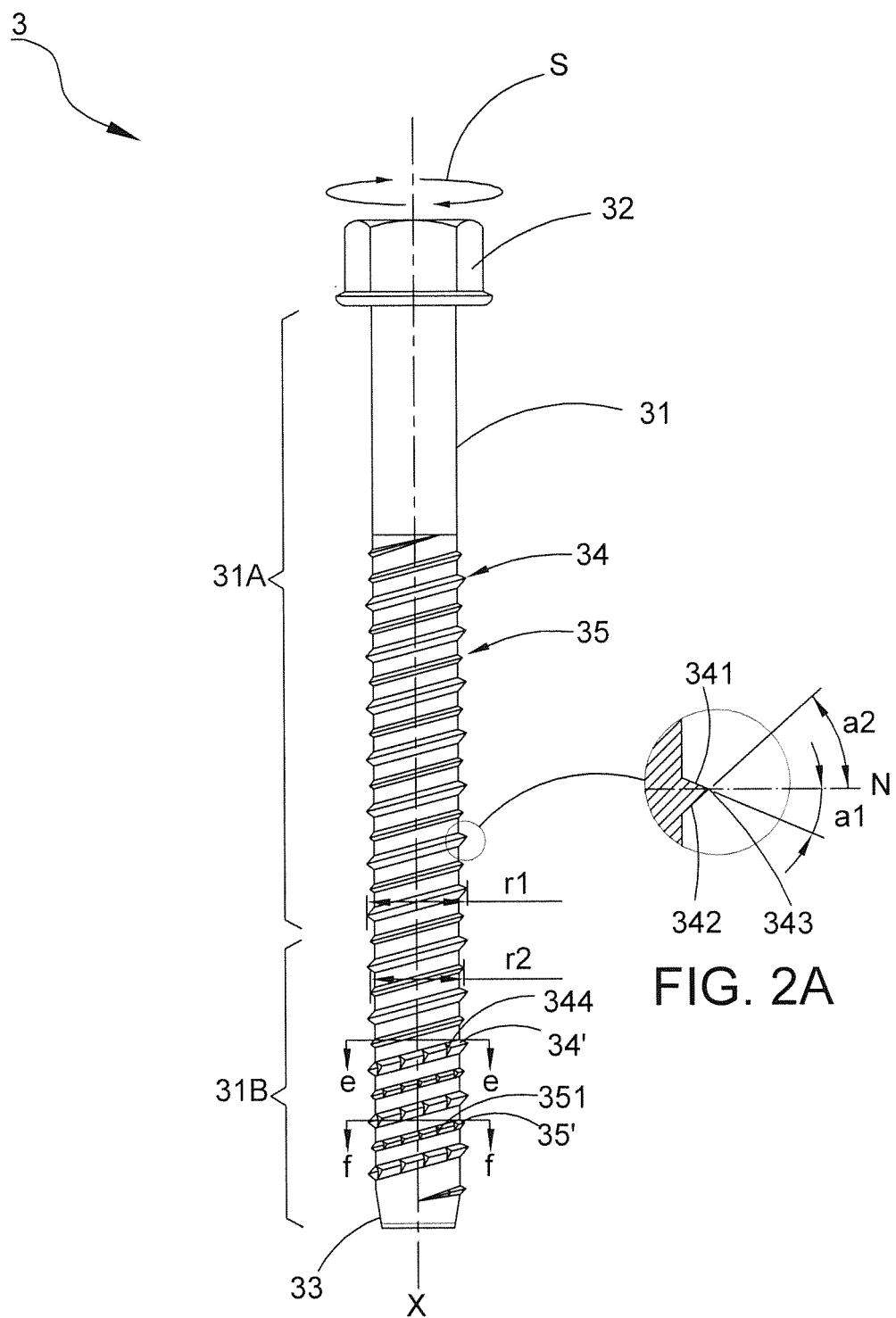
FIG. 2 is a schematic view showing a first preferred embodiment of this invention.
FIG. 2A is an enlarged view of FIG. 2.
Figure 3:
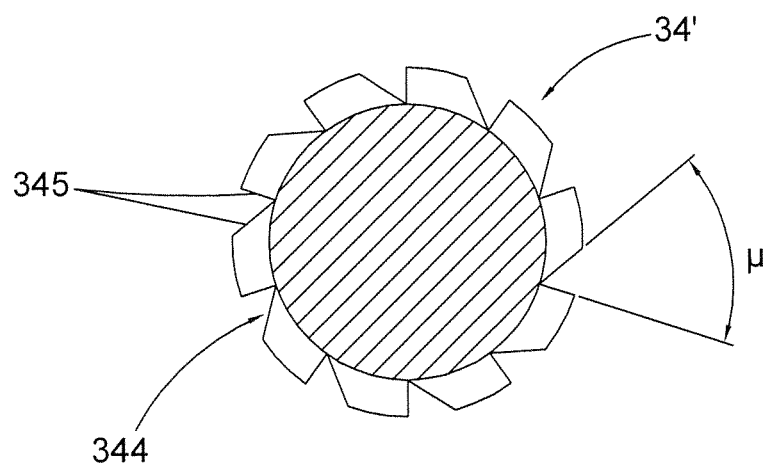
FIG. 3 is a cross-sectional view showing the first preferred embodiment as seen along the line e-e of FIG. 2.

Referring to FIG. 2, a fastening bolt 3 for use in concrete of the first preferred embodiment includes a shaft 31 defining a central axis X, a head 32 disposed on a first end of the shaft 31, a drilling portion 33 formed on a second end of the shaft 31 opposite to the first end, a plurality of first threads 34, 34' spirally disposed on the shaft 31 and extending from the drilling portion 33 toward the head 32, and a plurality of second threads 35, 35' spirally disposed between the first threads 34, 34'. Also referring to FIG. 2A, each of the first threads 34, 34' has a trailing surface 341 facing the head 32 and a leading surface 342 facing the drilling portion 33. The leading surface 342 and the trailing surface 341 converge on a thread ridge 343. A line N perpendicular to the central axis X of the shaft 31 is defined to pass the thread ridge 343. The leading surface 342 and the trailing surface 341 are respectively orientated at respective angles. In other words, the leading surface 342 is inclined with respect to the line N by a leading angle a2. The trailing surface 341 is inclined with respect to the line N by a trailing angle a1. The trailing angle a1 is smaller than the leading angle a2 to provide an asymmetrical thread design. Herein, the trailing angle a1 is set between 18 degrees and 28 degrees, and the leading angle a2 is set between 37 degrees and 47 degrees. Furthermore, some of the first threads close to the drilling portion 33, as depicted by the numeral 34', have a plurality of cutting grooves 344 formed thereon. Each cutting groove 344, shown in FIG. 3, is formed by walls 345 having different lengths, thereby being in an asymmetrical form. The cutting groove 344 is opened at an angle μ which does not exceed 90 degrees. Herein, the angle μ can be less than or equal to 90 degrees. The cutting grooves 344 of each first thread 34' are opened in a direction opposite to a screwing direction S of the shaft 31 of FIG. 2 to attain a quick breaking effect and provide a firm engagement for an anti-loosening effect.

Figure 4:
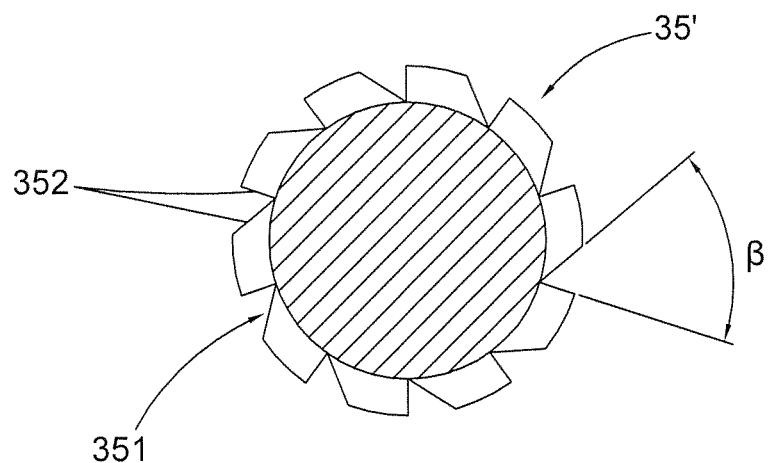
FIG. 4 is a cross-sectional view showing the first preferred embodiment as seen along the line f-f of FIG. 2.
Figure 5:
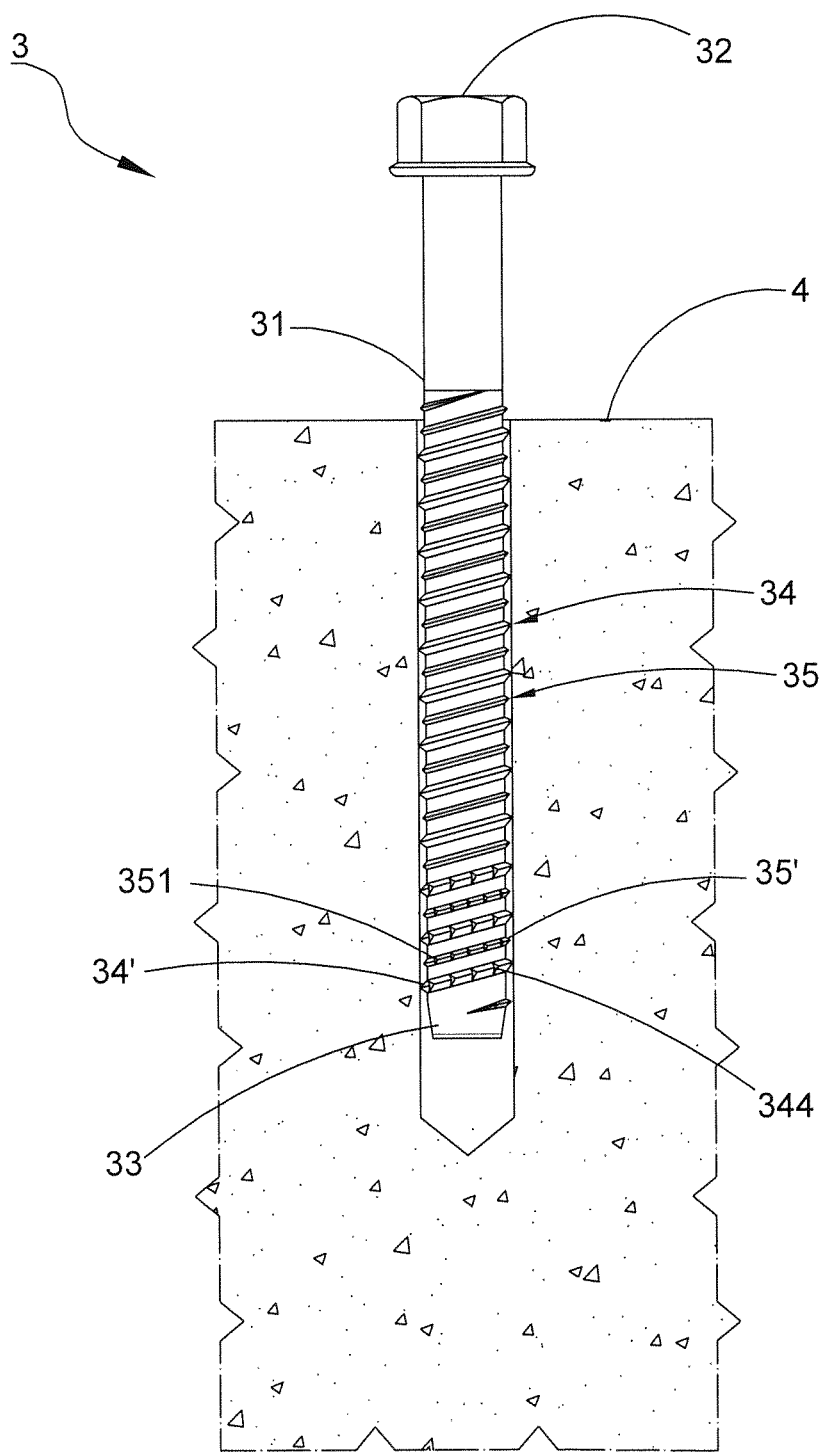
FIG. 5 is a schematic view showing the first preferred embodiment in use.

An outer diameter r2 of the second threads 35, 35' is smaller than an outer diameter r1 of the first threads 34, 34', thereby helping reduce the resistance during the operation and entering quickly. Some of the second threads close to the drilling portion 33, as depicted by the numeral 35', have a plurality of recesses 351 formed thereon. Each of the recesses 351, as shown in FIG. 4, is formed by support walls 352 with different lengths and opened at an included angle β which is not over 90 degrees. The recesses 351 are also opened in a direction opposite to the screwing direction S as described above. Thus, the bolt 3 can break the workpiece quickly with the aid of cutting grooves 344 and recesses 351. Further, the shaft 31 is preferably made of two materials, such as an anti-rust section 31A made of stainless steel which extends downwards from the head 32 by a certain length and a hardened section 31B made of carbon steel which extends from the anti-rust section 31A to the drilling portion 33. This hardened section 31B with higher hardness assists the drilling portion 33 in drilling and entering quickly. The anti-rust section 31B exposed to the outside helps keep the shaft 31 from rusting and corroding in order to attain a good appearance of use.

The operation is described with the aid of FIGS. 2-5. Firstly, the head 32 is rotated by a driver tool (not shown) to impart a rotating torque to the shaft 31 which drives the drilling portion 33 to enter a workpiece 4, such as a concrete wall 4. Those first threads 34' and second threads 35' close to the drilling portion 33 are concurrently rotated and gradually drilled into an interior of the wall 4, namely an inner wall of a pre-drilled pilot hole of the concrete. Then, the cutting grooves 344 of the first threads 34' alternate with the recesses 351 of the second threads 35' to help break the wall 4 quickly at the beginning of the drilling action. Concurrently, the second threads 35' with the smaller outer diameter r2 enters the hole quickly by following the first threads 36' with the larger outer diameter r1, thereby reducing the drilling resistance. Debris, small pieces of the wall 4 broken by the drilling and breaking action, can be introduced into the cutting grooves 344 and the recesses 351 and then be pushed to move along the spiral or helical direction of the first threads 34' and the second threads 35'. When the alternating threads of the shaft 31 keep drilling into the wall 4, the opening direction of the cutting grooves 344 and the recesses 351 allows part of the debris to be stored therein. Meanwhile, because the larger leading angle a2 causes the leading surface 342 a steeper gradient, the first threads 34' maintain a vertical entry into the wall 4 and prevent the shaft 31 subjected to the rotating torque and the drilling resistance from drilling aslant. Therefore, the beginning of the drilling action is stable and quick. When the head 32 is continuously rotated to insert the drilling portion 33 into the wall 4, the remaining first threads 34 and second threads 35, far from the drilling portion 33, keep entering along a drilling track formed by those cutting grooves 344 and recesses 351. Thus, the drilling speed is increased. Because the leading angle a2 of the leading surface 342 is larger than the trailing angle a1 of the trailing surface 341 to provide the steeper gradient as described above, the first threads 34 alternating with the second threads 35 can enter the wall 4 without obstruction to provide a quick and vertical drilling motion and concurrently press the broken debris to engage the wall 4 firmly. Therefore, the bolt 3 attains a quick drilling speed and preferable mechanical properties, such as anti-torque characteristic and tensile strength, prevents the shaft 31 from entering aslant and attains a better fastening effect to enhance the engagement between the bolt 3 and the wall 4.

To sum up, the fastening bolt for use in concrete takes advantage of cutting grooves and recesses respectively defined on some of the alternating first and second threads near the drilling portion to help break the wall of the workpiece quickly. The asymmetrical configuration of each first thread and the alternating first and second threads with different outer diameters allow the shaft to enter the workpiece smoothly, and quickly, thereby providing a quick drilling speed and preferable mechanical properties, such as anti-torque characteristic and tension strength. The claimed structure also prevents the shaft from drilling aslant in order to attain a better fastening effect and enhance the engagement between the bolt and the workpiece.

While the embodiment of this invention is shown and described, it is understood that further variations and modifications may be made without departing from the scope of this invention.

What is claimed is:
1. A fastening bolt for use in concrete comprising:
   a shaft defining a central axis;
   a head disposed on a first end of said shaft;
   a drilling portion defined on a second end of said shaft opposite to said first end;
   a plurality of first threads spirally disposed on said shaft and extending from said drilling portion toward said head; and
   a plurality of second threads spirally disposed between said first threads, wherein an outer diameter of said second threads is smaller than an outer diameter of said first threads, one of said second threads being an unbroken second thread disposed toward the head of the shaft and uninterruptedly encircling the shaft at least once, a remainder of said second threads being broken second threads disposed toward the drilling portion of the shaft and having a plurality of recesses formed thereon;
   wherein each of said plurality of first threads has a trailing surface facing said head and a leading surface facing said drilling portion, said leading surface and said trailing surface converging on a thread ridge, said first thread defining a line which is perpendicular to said central axis of said shaft and passes said thread ridge, said leading surface being inclined to said line at a leading angle, said trailing surface being inclined to said line at a trailing angle, said trailing angle being smaller than said leading angle, one of said first threads being an unbroken first thread disposed toward the head of the shaft and uninterruptedly encircling the shaft at least once, a remainder of said first threads being broken first threads disposed toward the drilling portion of the shaft and having a plurality of cutting grooves formed thereon, each of said plurality of cutting grooves being formed by walls with different lengths and being opened at an angle, said angle being not over 90 degrees, each of said plurality of cutting grooves being opened in a direction opposite to a screwing direction of said shaft.

2. The fastening bolt for use in concrete as claimed in claim 1, wherein said trailing angle is set between 18 degrees and 28 degrees, and said leading angle is set between 37 degrees and 47 degrees.

3. The fastening bolt for use in concrete as claimed in claim 1, wherein said shaft is made of two materials.

4. The fastening bolt for use in concrete as claimed in claim 3, wherein said shaft is divided into an anti-rust section extending downwards from said head and a hardened section extending from said anti-rust section to said drilling portion, said anti-rust section being made of stainless steel, said hardened section being made of carbon steel.

5. The fastening bolt for use in concrete as claimed in claim 1, wherein each of said plurality of recesses is formed by support walls with different lengths and is opened at an included angle, said included angle being not over 90 degrees, each of said plurality of recesses being opened in a direction opposite to said screwing direction of said shaft.

6. The fastening bolt for use in concrete as claimed in claim 1, wherein the plurality of recesses are devoid of alignment with the plurality of cutting grooves.

\* \* \* \* \*